United States Patent Office 3,306,903
Patented Feb. 28, 1967

3,306,903
1-AMINOPYRIDYL-4-(PHENYL OR PYRIDYL)-
PIPERAZINES AND INTERMEDIATES
Padam Chand Jain and Nitya Anand, Lucknow, India, assignors to Council of Scientific and Industrial Research, New Delhi, India
No Drawing. Filed Oct. 7, 1965, Ser. No. 493,910
25 Claims. (Cl. 260—268)

This invention relates to compositions of matter classified in the art of chemistry as subtituted piperazines and to intermediates obtained in the synthesis thereof.

The invention sought to be patented, in its final product composition aspect, is described as residing in the concept of a chemical compound having a molecular structure wherein there is attached to one nitrogen atom of a piperazine nucleus an amino-substituted pyridyl radical and to the other nitrogen atom a phenyl radical or an amino-substituted pyridyl radical, and the hereinafter described equivalents thereof.

The invention sought to be patented, in its intermediate composition aspect, is described as residing in the concept of a chemical compound having a molecular structure wherein there is attached to one nitrogen atom of a piperazine nucleus a nitro-substituted pyridyl radical and to the other nitrogen atom a phenyl radical or a nitro-substituted pyridyl radical, and the hereinafter described equivalents thereof.

As used throughout the application the terms "lower alkyl" and "lower alkoxy" embrace both straight and branched chain alkyl and alkoxy radicals, respectively, containing from 1 to 6 carbon atoms, for example methyl, ethyl, n-propyl, isopropyl, n-butyl, tert-butyl, n-amyl, sec-amyl, n-hexyl, 2-ethylbutyl, 2,3-dimethylbutyl and the like in the case of lower alkyl and methoxy, ethoxy, propoxy, isopropoxy, n-butoxy, tert-butoxy, n-amoxy, sec-amoxy, n-hexyloxyl, 2-ethylbutoxy, 2,3-dimethylbutoxy and the like in the case of lower alkoxy and the term "halo" embraces chloro, bromo, iodo and fluoro.

The tangible embodiments of this invention, in both its final product and intermediate composition aspects, possess the inherent general physical characteristics of being solid crystalline materials. Elemental analysis and the aforementioned physical characteristics, taken together with the nature of the starting materials and mode of synthesis, positively confirm the structures of the compounds sought to be patented.

The tangible embodiments of this invenion, in is final product composition aspect, possess the inherent applied use characteristics of having significant pharmacological activity, without adverse toxicity, as anticonvulsant, anti-inflammatory, antipyretic, analgesic and hypotensive agents as determined by recognized and accepted pharmacological test procedures. The tangible embodiments of this invention, in its intermediate composition aspect are valuable as chemical intermediates, as hereinafter described, in the preparation of the tangible embodiments of this invention in its final product composition aspect.

The manner and process of making and using the invention will now be generally described so as to enable one skilled in the art of chemistry to make and use the same as follows:

The reaction sequence leading to the preparation of the N,N′-disubstituted piperazines of this invention is set forth as follows:

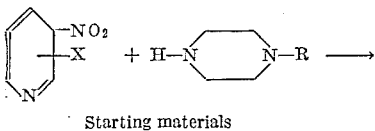

Starting materials

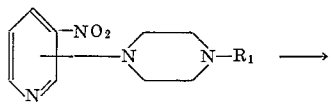

Intermediate composition

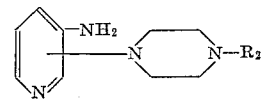

Final product wherein R is a member selected from the group consisting of hydrogen and phenyl, $R_1$ is phenyl or nitro-substituted pyridyl; $R_2$ is phenyl or amino-substituted pyridyl; and X is halogen.

The halonitropyridine starting materials described in the reaction sequence depicted hereinabove are known compounds that are disclosed in the chemical literature and are readily prepared from their corresponding hydroxynitropyridines by treatment with an agent capable of replacing the hydroxyl with a halogen atom, for example phosphorus pentachloride, thionyl chloride and the like. Thus 4-chloro-3-nitropyridine ($R_1$=H) is obtained from 4-hydroxy-3-nitropyridine (Kruger and Mann, J. Chem. Soc. 1955, 2755), 2-chloro-3-nitropyridine ($R_1$=H) is obtained from 2-hydroxy-3-nitropyridine (Ahmed and Hey, J. Chem. Soc. 1954, 4516) and 2-chloro-3,5-dinitropyridine ($R_1$=—$NO_2$) is obtained from 2-hydroxy-3,5-dinitropyridine after nitration of 2-hydroxy-5-nitropyridine (Plazek, Rec. trav. Chim. 72; 569 (1953)).

N-phenylpiperazine starting materials, such as are described in the reaction sequence depicted hereinabove, are also known compounds that are conveniently prepared, as described by Mann (J. Chem. Soc., 1934, 461), by condensation of appropriately substituted anilines with bis-(β-chloroethyl)-amine hydrochloride.

Starting materials wherein the benzene ring of the N-phenylpiperazine bears one or more lower alkyl, hydroxy, lower alkoxy, halo or trifluoromethyl radicals are the full equivalents in the above depicted reaction sequence to the specific N-phenylpiperazine starting material therein described, and such substituted N-phenylpiperazines are prepared by the same procedures disclosed in the Mann paper referred to hereinabove. Similarly, starting materials wherein the carbon atoms of the piperazine nucleus bear one or more lower alkyl, hydroxy, lower alkoxy, halo or trifluoromethyl radicals are the full equivalents in the above depicted reaction sequence to the specific piperazine nucleus therein described. Such substituted piperazines are prepared by the same procedures employed to prepare piperazines wherein the carbon atoms remain unsubstituted. The use of such substituted piperazines and N-phenylpiperazines in the above reaction sequence results in the preparation of intermediate compositions and final products bearing lower alkyl, hydroxy, lower alkoxy, halo or trifluoromethyl radicals at the same position/positions as in the starting materials, such intermediates and final products having the same utility as the specific intermediates and final products depicted in the reaction sequence and being included within the scope of this invention.

In addition, the nitrohalopyridine starting material can contain one or more additional nitro substituents and the use of such starting materials in the above-described reaction sequence results in the preparation of intermediates with nitro substituents on the pyridine ring in the same position as in the starting material and final products with amino substituents on the pyridine ring in the same position as are the nitro groups in the starting material, such intermediates and final products having the same utility as the compounds specifically depicted in the reaction sequence and being the full equivalents thereof.

The N-(nitropyridyl)-N'-phenylpiperazines that comprise the tangible embodiments of this invention in its intermediate composition aspect wherein $R_2$ is phenyl are formed by the condensation, in essentially equimolar quantities, of the appropriate halonitropyridine and N-phenylpiperazine. The reaction is carried out in the presence of an inert solvent such as, for example, benzene or toluene and at a temperature of up to the boiling point of the solvent employed. If desired, a reagent, such as, for example, triethylamine may be included in the reaction mixture to take up the hydrogen halide formed in the reaction, thus allowing recovery of the product as the free base. Otherwise the product will be obtained in the form of its hydrogen halide salt.

The bis-N,N'-(nitropyridyl)piperazines that comprise the tangible embodiments of this invention in its intermediate composition aspect wherein $R_2$ is nitropyridyl are formed by treatment of anhydrous piperazine with the appropriate halonitropyridine, the latter being present in the reaction mixture in a molar ratio of two moles of the halonitropyridine to each mole of piperazine. The reaction is carried out in the presence of an inert organic solvent such as, for example, chloroform and at a temperature of up to the boiling point of the solvent used. Also present is a reagent, such as, for example, triethylamine, to take up the hydrogen halide liberated during the reaction. The product is recovered as the free base by the usual techniques of isolation and purification.

The N-(nitropyridyl)-N'-phenylpiperazines and bis-N,N'-(nitropyridyl)piperazines thus obtained, which comprise the tangible embodiments of this invention in its intermediate composition aspect, are converted to the corresponding N-(aminopyridyl)-N'-phenylpiperazines and bis-N,N'-(aminopyridyl)piperazines, that comprise the tangible embodiments of this invention in its final product composition aspect, by catalytic hydrogenation, in the presence of an inert solvent, over an appropriate catalyst such as, for example, Raney nickel, palladium and the like at a temperature of about 25°–30° C. and at a pressure of about 50 p.s.i. The reduced product is recovered by the usually employed conventional techniques of isolation and purification.

The tangible embodiments of this invention can, if desired, be converted into their non-toxic pharmaceutically acceptable acid-addition and quaternary ammonium salts. Salts which may be formed comprise, for example, salts with inorganic acids, such as the hydrochloride, hydrobromide, hydroiodide, sulfate, phosphate or the like. They may also comprise salts with organic acids, including monobasic acids such as the acetate or the propionate, and especially those with hydroxy organic acids and polybasic acids, such as the citrate, tartrate, malate and maleate. Pharmaceutically, the salt will not be substantially more toxic than the compound itself and, to be acceptable, it should be able to be incorporated into conventional liquid or solid pharmaceutical media. Among the useful quaternary ammonium salts are those formed by the like. Such pharmaceutically useful acid-addition and quaternary ammonium salts are the full equivalents of the bases from which they are derived and are included within the scope of this invention.

The tangible embodiments of this invention, in its final product composition aspect, either as free bases or in the form of a non-toxic pharmaceutically acceptable acid-addition or quaternary ammonium salt, can be combined with conventional pharmaceutical diluents and carriers to provide such dosage forms as tablets, suspensions, solutions, suppositories and the like.

The best mode contemplated by the inventors for carrying out the invention will now be set forth as follows:

The following example is illustrative of the preparation of tangible embodiments of this invention, in both its intermediate and final product composition aspects, wherein one of the nitrogen atoms of the piperazine nucleus bears a phenyl substituent.

EXAMPLE 1

(a) 1-phenyl-4-(3-nitro-4-pyridyl)piperazine.

A solution of 4-chloro-3-nitropyridine (15.85 g.) in dry toluene (20 ml.) is added dropwise with stirring to a solution of N-phenylpiperazine (24.3 g.) in dry toluene (50 ml.). The reaction mixture is then stirred at 80° C. for 2 hours, cooled and filtered. The filtrate is extracted with 2 N hydrochloric acid. The acidic extract is treated with decolorizing carbon and then made basic with concentrated ammonium hydroxide. The product is separated out as a yellow solid that is filtered and crystallized from ethanol, M.P. 138°–140° C.

By the same procedure are also prepared:

(b) 1-phenyl-4-(3-nitro-2-pyridyl)piperazine hydrochloride, M.P. 218°–220° C.
(c) 1-(p-chlorophenyl)-4-(3-nitro-4-pyridyl)piperazine, M.P. 169°–170° C.
(d) 1-p-tolyl-4-(3-nitro-4-pyridyl)piperazine, M.P. 132°–133° C.
(e) 1-o-tolyl-4-(3-nitro-4-pyridyl)piperazine, M.P. 131° C.
(f) 1-(3,4-dimethoxyphenyl)-4-(3-nitro-4-pyridyl)piperazine, M.P. 133° C.
(g) 1-(2,4-dimethoxyphenyl)-4-(3-nitro-4-pyridyl)piperazine, M.P. 142°–143° C.
(h) 1-phenyl-4-(3-amino-4-pyridyl)piperazine.

A solution of 1-phenyl-4-(3-nitro-4-pyridyl)piperazine (10 g.), prepared as described in (a) above, in tetrahydrofuran (100 ml.) is hydrogenated in the presence of Raney nickel catalyst at 25°–30° C. and at a pressure of 50 p.s.i. Hydrogen uptake continues for about 1½ hours. The reaction mixture is then filtered and the catalyst washed with hot tetrahydrofuran. The solvent is removed under reduced pressure and the residue placed in ethanol from which is crystallized the product, M.P. 191° C.

By the same procedure are also prepared:

(i) 1-phenyl-4-(3-amino-2-pyridyl)piperazine, M.P. 167°–168° C.
(j) 1-(p-chlorophenyl)-4-(3-amino-4-pyridyl)piperazine, M.P. 227°–228° C.
(k) 1-p-tolyl-4-(3-amino-4-pyridyl)piperazine, M.P. 173°–174° C.
(l) 1-o-tolyl-4-(3-amino-4-pyridyl)piperazine, M.P. 164°–165° C.
(m) 1-(3,4-dimethoxyphenyl)-4-(3-amino-4-pyridyl)piperazine, M.P. 145°–146° C.
(n) 1-(3,4-dihydroxyphenyl)-4-(3-amino-4-pyridyl)piperazine, M.P. >275° C.; trihydrobromide salt, M.P. 262°–264° C.
(o) 1-(2,4-dimethoxyphenyl)-4-(3-amino-4-pyridyl)piperazine, M.P. 171°–173° C.

The following example is illustrative of the preparation of tangible embodiments of this invention, in both its intermediate and final product composition aspects, wherein both nitrogen atoms of the piperazine nucleus bear substituted pyridyl radicals.

EXAMPLE 2

(a) Bis-1,4-(3-nitro-4-pyridyl)piperazine.

A solution of anhydrous piperazine (6.72 g.) in dry chloroform (10 ml.) is added with stirring to a solution of 4-chloro-3-nitropyridine (25.36 g.) and triethylamine (16.16 g.) in dry toluene (150 ml.). The reaction mixture is stirred an additional 60 minutes at 25°–30° C. and then heated on a steam bath for 3 hours. It is then cooled and filtered, the residue washed with water and the product, M.P. 252° C., crystallized from pyridine/water.

By the same procedure are also prepared:

(b) Bis-1,4-(3-nitro-2-pyridyl)piperazine, M.P. 201° C.
(c) Bis-1,4-(3,5-dinitro-2-pyridyl)piperazine, M.P. 259° C.
(d) Bis-1,4-(3-amino-4-pyridyl)piperazine dihydrochloride.

Bis-1,4-(3-nitro-4-pyridyl)piperazine (5.0 g.) in ethanol (100 ml.) is hydrogenated in the presence of palladium/carbon catalyst (10%) at a pressure of 50 p.s.i. When hydrogen uptake ceases the reaction mixture is treated with warm concentrated hydrochloric acid (10 ml.), warmed on a water bath and filtered. The residue is repeatedly extracted with hot 6 N hydrochloric acid. The combined extract is concentrated and cooled. The product separates out as the dihydrochloride which is recrystallized from 22% aqueous hydrochloric acid, M.P. >300° C.

By the same procedure are also prepared:

(e) Bis-1,4-(3-amino-2-pyridyl)piperazine, M.P. 226°–228° C.; dihydrochloride, M.P. >300° C.
(f) Bis-1,4-(3,5-diamino-2-pyridyl)piperazine tetrahydrochloride, M.P. 278°–282° C.(d).

The subject matter which the applicants regard as their invention is particularly pointed out and distinctly claimed as follows.

We claim:
1. 1-phenyl-4-(nitropyridyl)piperazine.
2. 1-phenyl-4-(3-nitro-4-pyridyl)piperazine.
3. 1-phenyl-4-(3-nitro-2-pyridyl)piperazine.
4. 1-(p-chlorophenyl)-4-(3-nitro-4-pyridyl)piperazine.
5. 1-p-tolyl-4-(3-nitro-4-pyridyl)piperazine.
6. 1-o-tolyl-4-(3-nitro-4-pyridyl)piperazine.
7. 1-(3,4-dimethoxyphenyl)-4-(3-nitro-4-pyridyl)piperazine.
8. 1-(2,4-dimethoxyphenyl)-4-(3-nitro-4-pyridyl)piperazine.
9. Bis-1,4-(nitropyridyl)piperazine.
10. Bis-1,4-(3-nitro-4-pyridyl)piperazine.
11. Bis-1,4-(3-nitro-2-pyridyl)piperazine.
12. Bis-1,4-(3,5-dinitro-2-pyridyl)piperazine.
13. 1-phenyl-4-(aminopyridyl)piperazine.
14. 1-phenyl-4-(3-amino-4-pyridyl)piperazine.
15. 1-phenyl-4-(3-amino-2-pyridyl)piperazine.
16. 1-(p-chlorophenyl)-4-(3-amino-4-pyridyl)piperazine.
17. 1-p-tolyl-4-(3-amino-4-pyridyl)piperazine.
18. 1-o-tolyl-4-(3-amino-4-pyridyl)piperazine.
19. 1-(3,4-dimethoxyphenyl-4-(3-amino-4-pyridyl)piperazine.
20. 1-(3,4-dihydroxyphenyl)-4-(3-amino-4-pyridyl)piperazine.
21. 1-(2,4-dimethoxyphenyl)-4-(3-amino-4-pyridyl)piperazine.
22. Bis-1,4-(aminopyridyl)piperazine.
23. Bis-1,4-(3-amino-4-pyridyl)piperazine.
24. Bis-1,4-(3-amino-2-pyridyl)piperazine.
25. Bis-1,4-(3,5-diamino-2-pyridyl)piperazine.

No references cited.

ALEX MAZEL, *Primary Examiner.*

HENRY R. SILES, *Examiner.*

R. BOYD, *Assistant Examiner.*

UNITED STATES PATENT OFFICE
CERTIFICATE OF CORRECTION

Patent No. 3,306,903                            February 28, 1967

Padam Chand Jain et al.

It is hereby certified that error appears in the above numbered patent requiring correction and that the said Letters Patent should read as corrected below.

Column 3, line 59, after "by" insert -- such alkyl halide as methyl iodide, n-hexylbromide and --.

Signed and sealed this 9th day of January 1968.

(SEAL)
Attest:

Edward M. Fletcher, Jr.                        EDWARD J. BRENNER
Attesting Officer                              Commissioner of Patents